United States Patent
Nadgir (10) Patent No.: US 9,332,419 B2
(45) Date of Patent: May 3, 2016

(54) COMMUNITY-BASED REQUEST FULFILLMENT

(71) Applicant: Cellco Partnership, Basking Ridge, NJ (US)

(72) Inventor: Kiran Nadgir, Milton, GA (US)

(73) Assignee: Cellco Partnership, Basking Ridge, NJ (US)

( * ) Notice: Subject to any disclaimer, the term of this patent is extended or adjusted under 35 U.S.C. 154(b) by 209 days.

(21) Appl. No.: 14/169,390

(22) Filed: Jan. 31, 2014

(65) Prior Publication Data

US 2015/0223051 A1 Aug. 6, 2015

(51) Int. Cl.
*H04W 4/00* (2009.01)
*H04W 8/18* (2009.01)
*H04W 4/02* (2009.01)

(52) U.S. Cl.
CPC ............... *H04W 8/186* (2013.01); *H04W 4/02* (2013.01)

(58) Field of Classification Search
IPC ....................................................... H04W 4/08
See application file for complete search history.

(56) References Cited

U.S. PATENT DOCUMENTS

| | | | |
|---|---|---|---|
| 2003/0014330 A1* | 1/2003 | Showghi | G06Q 10/06312 705/7.22 |
| 2007/0198360 A1* | 8/2007 | Rogers | G06Q 20/20 705/16 |
| 2008/0109412 A1* | 5/2008 | Drayer | G06Q 10/00 |
| 2009/0265366 A1* | 10/2009 | Marshall-wilson | H04L 67/32 |
| 2015/0264527 A1* | 9/2015 | Wang | H04W 4/021 455/456.3 |

* cited by examiner

*Primary Examiner* — Nimesh Patel (57) ABSTRACT

A coordinator device receives registration data regarding user devices and determines a group that includes two or more of the user devices based on registration data. The coordinator device receives a request, related to receiving a good or service, from a first user device included in the group. The registration data may include financial data for a user of the first user device, and the coordinator device uses the financial data to verify that the user has sufficient funds to pay a fee for the request. Based on verifying the sufficient funds, the coordinator device determines status data for other user devices included in the group and selects a second user device from the group based on the status data. The status data identifies, for example, locations associated with the group. The coordinator device then causes data associated with the request to be forwarded to the selected second user device.

20 Claims, 8 Drawing Sheets

COMMUNITY-BASED REQUEST FULFILLMENT

BACKGROUND INFORMATION

A user may seek assistance for a request by sending a message, calling, or otherwise communicating the request to another individual. In connection with the request, the user may review a directory of offered goods and services, such as a classified listing, to identify goods and services offered vendors operating in a particular area. The user may further research the vendors, such as performing Internet searching, to gather information in order to select from among the vendors. Certain vendors may also allow a user to leave feedback, such as a rating, so that other users may further select from among the vendors further based on the feedback.

DETAILED DESCRIPTION OF PREFERRED EMBODIMENTS

The following detailed description refers to the accompanying drawings. The same reference numbers in different drawings identify the same or similar elements.

Implementations described herein relate to a coordinator device that receives registration data regarding user devices and determines a group that includes two or more of the user devices based on registration data. The coordinator device receives a request from a first user device included in the group, and the request relates to receiving a good or service. The coordinator device determines status data for the two or more user devices included in the group and selects a second user device from the group based on the status data. The status data identifies, for example, locations associated with the group. The coordinator device then causes data associated with the request to be forwarded to the second user device.

The terms "subscriber" and/or "user" may be used interchangeably herein. Also, the terms "subscriber" and/or "user" are intended to be broadly interpreted to include a user device (e.g., a mobile telephone) or a user of the user device.

Figure 1:
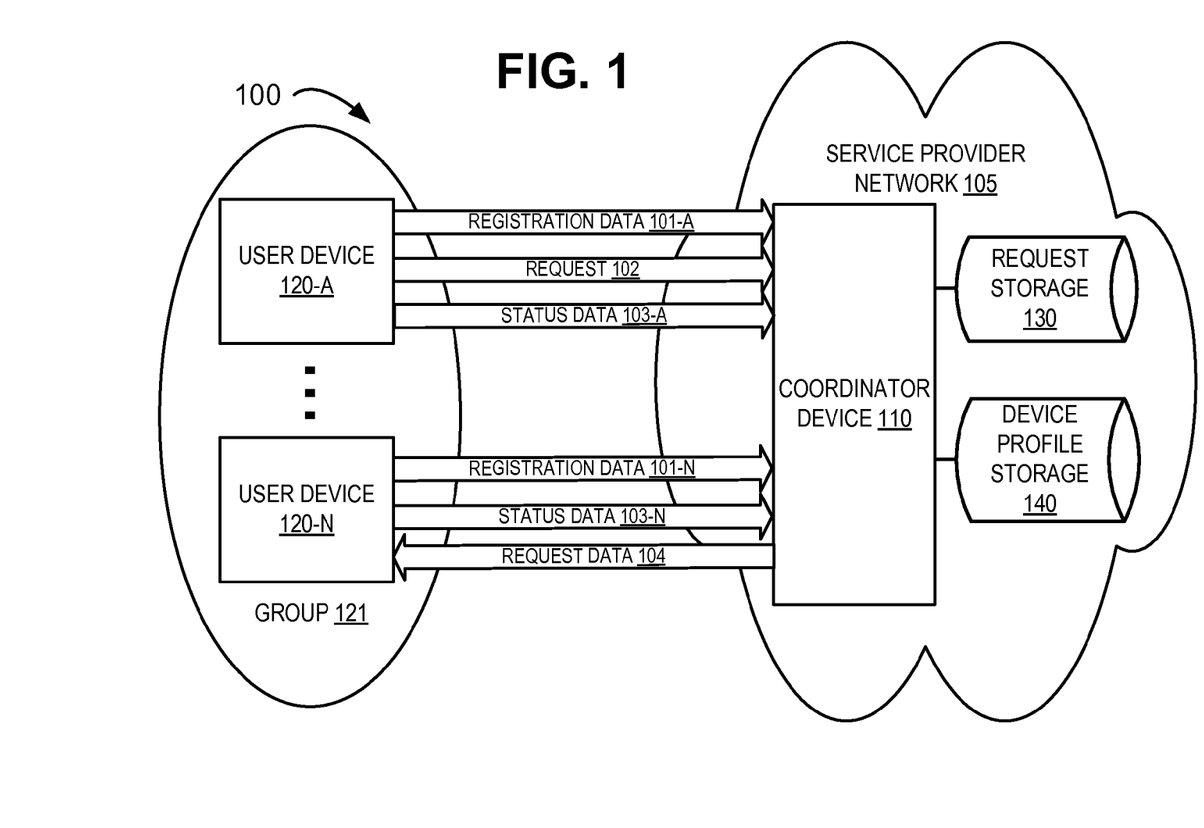
FIG. 1 is a diagram illustrating an exemplary environment for providing a community-based assistance system according to an implementation described herein.

FIG. 1 is a diagram illustrating an exemplary environment 100 for implementing a community-based assistance system. As illustrated in FIG. 1, environment 100 may include a service provider network (SPN) 105 and user devices 120-A through 120-N (referred to individually as user device 120 or collectively as user devices 120). SPN 105 may include, among other devices, a coordinator device 110, request storage 130, and device profile storage 140.

SPN 105 may include one or more devices that distributes or makes available a service, such as, a user assistance service. SPN 105 may also include a network that distributes or makes available mobile service, Internet service, and/or a television service. SPN 105 may include a satellite-based network and/or a terrestrial-based network. For example, SPN 105 may include a wireless network (e.g., a cellular network, a non-cellular network, a mobile network, a 3rd Generation (3G) network, a 4th Generation (4G) network) in combination with a Voice over Internet Protocol (VoIP) network, a packet-switched network, a television distribution network, and/or the Internet. Although not illustrated, SPN 105 may also include, for example, billing devices, authentication devices, security devices, or other devices that function in connection with the user assistance service, the mobile service, the Internet service, and/or the television service.

Coordinator device 110 may be implemented by one or multiple network devices. For example, the network device(s) may include a computational device (e.g., a computer, a server, an Application server, a web server, a peer device, etc.) or a cloud-computing service. Coordinator device 110 may provide user interfaces to users to submit registration data 101, request 102, and status data 103.

Coordinator device 110 may receive registration data 101-A through 101-N (collectively referred to as registration data 101) from user devices 120-A through 120-N. Registration data 101 may include, for example, information identifying users associated with user devices 120 (e.g., names or account numbers); location information associated with the users (e.g., a home or billing address); financial information (e.g., bank account data related to paying for or receiving credit for performance of requests); data identifying other associated user devices 120 (e.g., data identifying friends, contacts, family members, social media connections, co-workers, trusted vendors, etc.); or other information related to performing requests (e.g., available times, areas of expertise, types of requests to be performed, prior request history, desired payment for performing requests, etc.).

Coordinator device 110 may define a group 121 of user devices 120 based on registration data 101. For example, registration data 101 may identify that group 121 includes family members, members of an organization, neighbors, people connected via social media, etc. In another implementation, group 121 may be associated with user devices 120 that have entered a commercial relationship to perform certain services or provide certain goods. For example, a user of user device 120-N may enter a contractual relationship to receive a fee in exchange for providing certain goods or services in response to a request from user device 120-A.

Coordinator device 110 may receive a request 102 from user device 120-A. Request 102 may relate to receiving certain services or goods from a user associated with another user device 120. For example, user device 120-A may ask a user, associated with the other user device 120-N, to purchase and deliver an item from a store.

Coordinator device 110 may further determine status data 103-A through 103-N (collectively referred to as status data 103) identifying the status of user devices 120. For example, coordinator device 110 may determine most recent locations associated with user devices 120, movements of user devices 120, activities being performed via user devices 120, messages sent via user devices 120, data being exchanged with user devices 120, applications being executed by user devices 120, etc. Coordinator device 110 may receive status information 103 from user device 120. In addition or alternatively, coordinator device 110 may receive status information 103 from another device (e.g., another device included in SPN 105) or may dynamically determine status information 103 (e.g., based on messages exchanged with user device 120). Coordinator device 110 may also periodically update the stored status information.

Coordinator device 110 may select a user device 120 (e.g., user device 120-N) to perform a request based on status data 103. For example, coordinator device 110 may select user device 120-N that is active (e.g., turned on) and, therefore, able to receive and fulfill the request. In the above example in which request 102 relates to acquiring an item (e.g., a gallon of milk) from a store, coordinator device 110 may select user device 120-N that is located geographically closest to the store. In one implementation, multiple user devices 120 may be selected to fulfill the request 102 (e.g., user devices 120 located within a threshold distance of the store).

Coordinator device 110 may forward request data 104 to the selected user device 120-N to ask user device 120-N to complete request 102. For example, request data 104 may identify a task to be performed, a location and time to perform the task, and a fee (or other incentive) provided in exchange for performing the task.

Coordinator device 110 may further determine when request 102 is completed by user device 120-N based on, for example, messages received from user device 120-N and/or changes in the status of user device 120-N. In the above example in which request 102 relates to acquiring an item from a store, device 110 may determine (e.g., based on status data 103-N) that request 102 is completed based on user device 120-N being detected near (e.g., within a threshold distance of) the store.

Coordinator device 110 may receive registration data 101, request 102, and/or status data 103 from an application executed by user device 120. In addition or alternatively, coordinator device 110 may provide an interface to receive registration data 101, request 102, and/or status data 103. For example, coordinator device 110 may provide web pages that provide questions or a graphical user interface (GUI) to obtain registration data 101, request 102, and status data 103.

User device 120 may include, for example, a mobile device, a handheld device, a tablet device, a computer devices (e.g., a personal computer or a laptop) or a vehicle-based device. For example, user device 120 may take the form of a wireless phone (e.g., a smart phone, a cell phone, etc.), an Internet-access device (e.g., a netbook, an tablet device, etc.), or a vehicular communication system.

User device 120 may have location-aware capability. A variety of technologies or techniques (e.g., Global Positioning System (GPS), cellular positioning methods (e.g., triangulation, etc.), local positioning methods (e.g., Bluetooth, IEEE 802.11, WiFi, Ultra Wide Band (UWB), etc.)) exist to identify a geographic position associated with a user or a user device. Other technologies, such as, for example, an indoor positioning system (IPS) may also be utilized to determine a location of a user device. User devices 120 may be capable of communicating with one or more devices in SPN 105 in connection with identifying and instructing one user device 120-N to perform request 102 on behalf of another user device 120-A.

Request storage 130 may store information related to request 102. For example, request storage 130 may store data identifying a task to be performed, a location associated with the task, a time to perform the task, a user device 120-A originating request 102, and another user device 120-N assigned to perform request 102.

According to an exemplary embodiment, the request information in request storage 130 may be stored as a database (e.g., a relational database, a distributed database, a document-oriented database, or other type of suitable database). According to other embodiments, request storage 130 may be a data structure (e.g., files, records, arrays, lists, objects, etc.). The request storage 130 may be indexed based on one or more types of request information types (e.g., data identifying a task to be performed, a location associated with the task, a time to perform the task, a user device 120-A originating request 102, and another user device 120-N assigned to perform request 102, etc.). Request storage 130 may be implemented by one or multiple network devices, such as a storage device (e.g., a hard disk or other tangible storage medium) and/or a computational device (e.g., a computer, a server, etc.). Request storage 130 may include additional, fewer, or different types of information.

Device profile storage 140 may include profiles associated with user devices 120. For example, device profile storage 140 may store data identifying (1) a user device 120, such as an SPN 105 address, an Internet protocol (IP) address, an electronic serial number (ESN), or an mobile equipment identifier (MEID); (2) a location of user device 120 (e.g., identifying a GPS coordinate or a base tower or base station connected to user device 120); and (3) a status of user device 120 (e.g., whether user device 120 is active or turned on, whether user device 120 is in motion, an application being used by user device 120, user device 120 is assigned to a request 102, etc.).

Each device profile stored in device profile storage 140 may include information pertaining to an associated user device 120 or an associated user. For example, according to an exemplary embodiment, a device profile may include information indicating a name of the associated user, a photo of the user, information indicating a home location of the user (e.g., city, state, etc.), information indicating the profession of the user (e.g., policeman, professor, student, teacher, plumber, etc.), and/or information indicating a user rating (e.g., a numerical value, a star rating, etc.). The user rating may indicate an average rating, received from other users, that corresponds to an evaluation of the user's performance on prior requests.

According to another embodiment, a device profile stored in device profile storage 140 may include additional, fewer, or different types of information. By way of example, the device profile may include information pertaining to an availability of a user device 120 (e.g., days (e.g., Monday-Friday, etc.), times (e.g., between 6 p.m.-11 p.m., evenings, mornings, etc.), dates, (January-August), etc.), a preferred choice of communication type to receive request data 104, (e.g., e-mail, short-messaging service (SMS), telephone, video-telephony, etc.), a category of expertise associated with a user of user device 120, preferred providers of goods, etc.

According to an exemplary embodiment, device profile storage 140 may be a database (e.g., a relational database, a distributed database, a document-oriented database, or other type of suitable database). According to other embodiments, device profile storage 140 may be a data structure (e.g., files, records, arrays, lists, objects, etc.). Device profile storage 140 may be indexed based on one or more types of device profile information types (e.g., data identifying user device 120, a status of user device 120, etc.). Device profile storage 140 may be implemented by one or multiple network devices, including a storage device (e.g., a hard disk or other tangible storage medium) and/or a computational device (e.g., a computer, a server, etc.).

The number of devices and networks, and the configuration in environment 100 is exemplary and provided for simplicity. In practice, according to other embodiments, environment 100 may include additional devices, fewer devices, different devices, and/or differently arranged devices, than those illustrated in FIG. 1. Additionally, according to another embodiment, environment 100 may include additional networks, fewer networks, and/or differently arranged networks, than those illustrated in FIG. 1.

Also, according to another embodiment, one or more functions and/or processes described as being performed by a particular device may be performed by a different device or a combination of devices. For example, according to an embodiment, a function or a process described as being performed by two or more devices may be performed by a single device. Conversely, according to another embodiment, a function or a process described as being performed by a single device may be performed by two or more devices or by a different device. By way of example, one or more functions and/or processes described as being performed by request storage 130 may be performed by coordinator device 110 or vice versa. Also, request storage 130 and device profile storage 140 may be combined. Environment 100 may include wired and/or wireless connections among the devices illustrated.

Figure 2:
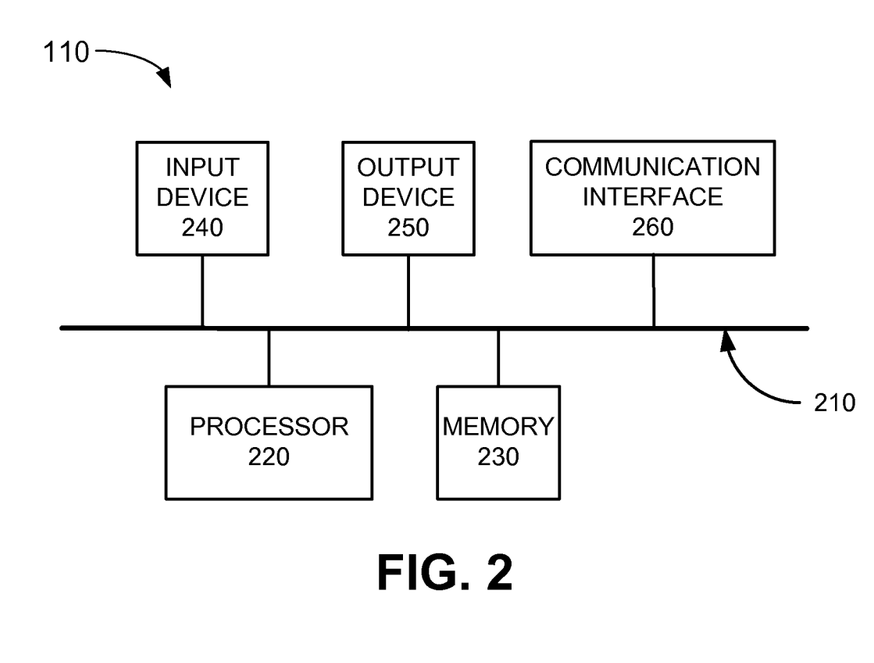
FIG. 2 is a diagram illustrating exemplary components of a coordinator device included in the environment of FIG. 1 according to an implementation described herein.

FIG. 2 is a diagram illustrating exemplary components of coordinator device 110 according to an implementation described herein. As shown in FIG. 2, coordinator device 110 may include a bus 210, a processor 220, a memory 230, an input device 240, an output device 250, and a communication interface 260.

Bus 210 may include a path that permits communication among the components of coordinator device 110. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into coordinator device 110. Input device 240 may include, for example, a keyboard, a mouse, a pen, a microphone, a remote control, an audio capture device, an image and/or video capture device, a touch-screen display, and/or another type of input device. In some embodiments, coordinator device 110 may be managed remotely and may not include input device 240. In other words, coordinator device 110 may be "headless" and may not include a keyboard, for example.

Output device 250 may output information to an operator of coordinator device 110. Output device 250 may include a display, a printer, a speaker, and/or another type of output device. For example, coordinator device 110 may include a display, which may include a liquid-crystal display (LCD) for displaying content to the customer. In some embodiments, coordinator device 110 may be managed remotely and may not include output device 250. In other words, coordinator device 110 may be "headless" and may not include a display, for example.

Communication interface 260 may include a transceiver that enables coordinator device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, coordinator device 110 may perform certain operations relating to selecting a user device 120-N to perform a request 102 from another user device 120-A and identifying completion of the request 102 by user device 120-N. Coordinator device 110 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of coordinator device 110, in other implementations, coordinator device 110 may include fewer components, different components, additional components, or differently arranged components than depicted in FIG. 2. Additionally or alternatively, one or more components of coordinator device 110 may perform one or more tasks described as being performed by one or more other components of coordinator device 110.

Figure 3:
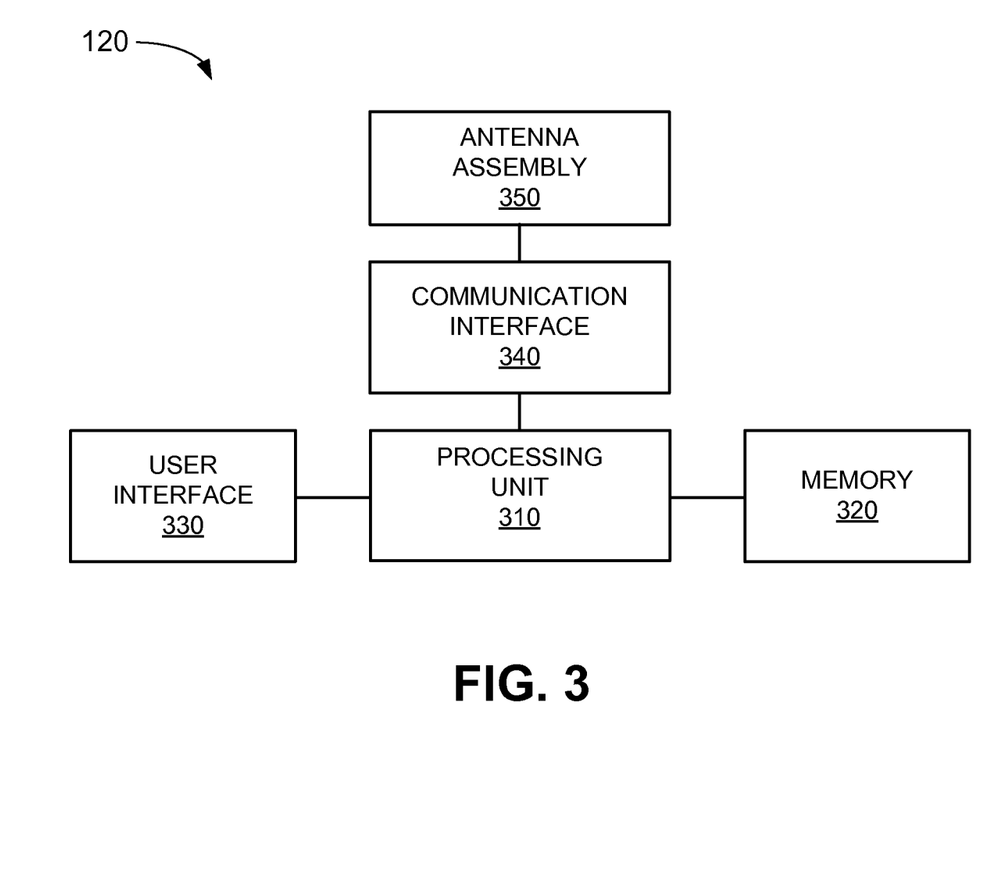
FIG. 3 is a diagram illustrating exemplary components of a user device included in the environment of FIG. 1 according to an implementation described herein.

FIG. 3 is a diagram illustrating exemplary components of user device 120 according to an implementation described herein. As shown in FIG. 3, user device 120 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of user device 120 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to user device 120 and/or to output information from user device 120. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause user device 120 to vibrate; and/or any other type of input or output device.

Communication interface 340 may include a transceiver that enables user device 120 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals and receive RF signals and provide them to communication interface 340.

As described herein, user device 120 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows example components of user device 120, in other implementations, user device 120 may include fewer components, different components, differently arranged components, or additional components than depicted in FIG. 3. Additionally or alternatively, one or more components of user device 120 may perform the tasks described as being performed by one or more other components of user device 120.

Figure 4:
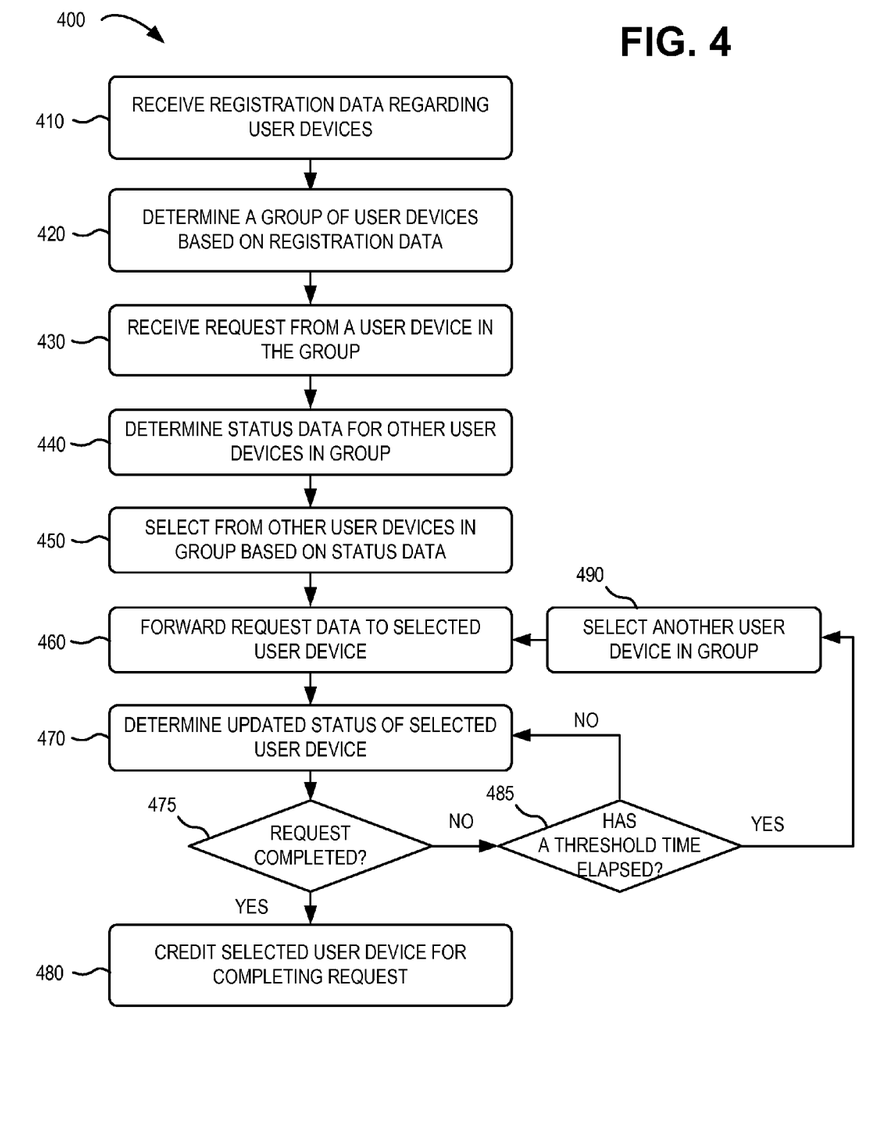
FIG. 4 is a flowchart illustrating an exemplary process for coordinating user devices in the environment of FIG. 1 to complete a request from another user device according to an implementation described herein.

FIG. 4 is a flowchart illustrating an exemplary process 400 for coordinating user devices 120 to complete a request from one or more other user devices 120. In one implementation, process 400 may be performed by coordinator device 110. In other implementations, some or all of process 400 may be performed by another device or a group of devices separate from and/or including coordinator device 110, such as a user device 120.

Process 400 may include receiving registration data related to user devices 120 (block 410). For example, as described above in the discussion of environment in FIG. 1, the registration data 101 may include information identifying users associated with user devices 120 (e.g., names or account numbers); location information associated with the users (e.g., a home or billing address); financial information (e.g., bank account data related to paying for or receiving credit for performance of requests); data identifying other associated user devices 120 (e.g., data identifying friends, contacts, family members, social media connections, co-workers, trusted vendors, etc.); or other information related to performing requests (e.g., available times, areas of expertise, types of requests to be performed, prior request history, desired payment for performing requests, etc.).

Coordinator device 110 may receive the registration data from user devices 120. For example, coordinator device 110 may receive messages or other information (e.g., a completed web-form served to user device 120) from user devices 120 that includes the registration data. In one implementation, coordinator device 110 may update device profile storage 140 based on the registration data.

Figure 5:
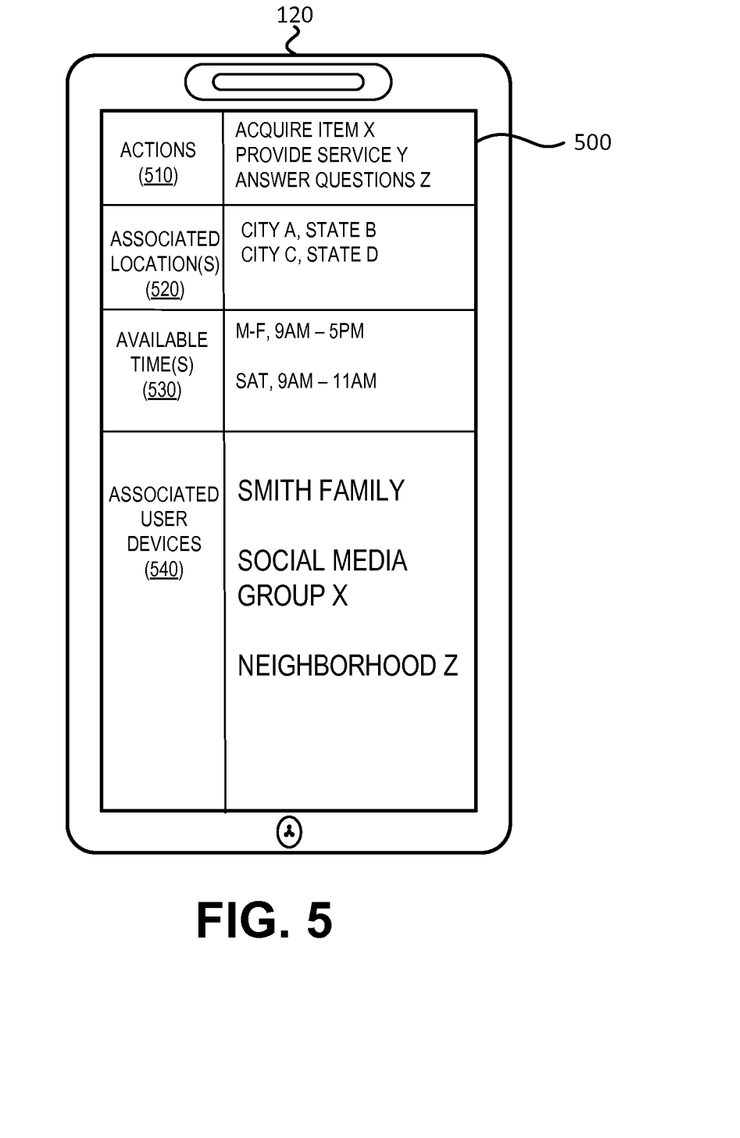
FIGS. 5-8 show exemplary interfaces that may be presented by the user device included in the environment of FIG. 1 according to implementations described herein.

Referring to FIG. 5, an exemplary registration interface 500 provided by user device 120 to collect the registration data in block 410 is shown. As shown in FIG. 5, registration interface 500 may include an actions area 510 identifying types of requests to be performed by or on behalf of the particular user device 120 (shown in FIG. 5 as "ACQUIRE ITEM X," "PROVIDE SERVICE Y," and "ANSWER QUESTIONS Z"). Registration interface 500 may also include an associated locations area 520 identifying locations associated with the particular user device 120 (e.g., a city and state for a residence and/or workplace associated with the particular user device 120). In FIG. 5, associated locations area 520 is shown to include "CITY A, STATE B" and "CITY C, STATE D." Registration interface 500 may also include an available times area 530 identifying when (e.g., times and day) the user device 120 is available to provide or receive a service/good related to a request. In FIG. 5, available times area 530 is shown to include "M-F, 9 AM-5 PM" and "SAT, 9 AM-11 AM."

Registration interface 500 may further include an associated user devices area 540 identifying other user devices 120 associated with the particular user device 120 (e.g., stored contacts). Associated user devices area 540 may identify other user devices 120 that the particular user device 120 has identified to provide and/or receive services (e.g., a stored provider list). For example, user devices area 540 may identify other user devices 120 that are in a contractual relationship to service requests from the particular user device 120, such as identifying medical personal affiliated with an insurance carrier used by a user of user device 120. In other instances, user device area 540 may identify other preferred user devices 120 with which the user of user devices 120 would like to use to provide goods/services.

In one implementation, user devices area 540 may also identify different user devices 120 for different types of requests. For example, user devices area 540 may identify a first group of user devices 120 associated with trusted vendors of a particular good, and a second group of user devices 120 associated with trusted providers of a particular service.

As shown in FIG. 5, associated user devices area 540 may include information identifying family members (e.g., indicating the particular user device 120 is associated with the "SMITH FAMILY"), social media friends (e.g., indicating the particular user device 120 is associated with "SOCIAL MEDIA GROUP X," and locations-based connections (indicating the particular user device 120 is associated with "NEIGHBORHOOD Z"). Although not shown in FIG. 5, associated user devices area 540 may also identify user devices 120 that are associated with the particular user device based on other factors. For example, associated user devices area 540 may also identify user devices 120 that are identified as contacts, co-workers, etc.

Although FIG. 5 shows an exemplary registration interface 500, in other implementations, registration interface 500 may include fewer areas, different areas, differently arranged areas, or additional areas than depicted in FIG. 5. For example, registration interface 500 may include areas identifying desired payment methods, desired communications methods, and/or prior requests associated with the user device 120.

In another implementation, some or all of the registration data may be collected in process block 410 from sources that differ from user devices 120. For example, the registration data may be collected based on prior requests submitted by and/or performed by a user device 120 (e.g., from request storage 130). The registration data may also be collected from an account server associated with SPN 105 (e.g., collected in connection with providing other services, such as data or communications services, to user devices 120). In another example, the registration data may be obtained through an online search, such as identifying user devices 120 associated with known providers of a good or service.

Returning to process 400 in FIG. 4, coordinator device 110 may determine a group of user devices 120 based on the received registration data (block 420). For example, coordinator device 110 may identify that certain user devices 120 are associated with family members (e.g., user devices 120 associated with users sharing a common family and/or residence), co-workers (e.g., user devices 120 associated with users sharing a common work address), neighbors (e.g., user devices 120 associated with residences within a threshold distance of a geographic location), friends (e.g., user devices 120 associated with common contacts); connected via social media, members of an organization, etc. In another example, coordinator device 110 may match user devices 120 based on, for example, comparing data included associated user devices area 540 in registration interface 500.

In another example, a group of user devices 120 may enter a commercial relationship to perform certain services or provide certain goods. For example, a group of user devices 120 may be associated with users registered to provide certain goods/services. In another example, the group may correspond to user devices 120 associated with volunteers in charitable group who have offered to provide certain services and/or goods to other user devices 120 registered with the charitable group.

In one implementation, a group may be defined in process block 420 based on registration data received from a particular user device. For example, the particular user device 120 may designate other user devices 120 to associate with a group providing a good or service. In this example, registration data may be further collected, in process block 410, from a particular user device 120 based on the particular user device 120 being identified in registration data received from another user device 120.

In one implementation, coordinator device 110 may update device profile storage 140 to identify groups associated with user device 120. For example, device profile storage 140 may store information identifying one or more groups associated with each user device.

Coordinator device 110 may receive a request from a user device 120 in a group (block 430). The request may relate to receiving certain services or goods from a user associated with user device 120. In one implementation, coordinator device 110 may also update request storage 130 to include information regarding a received request. As previously described, a request may relate to another user, associated with another user device 120, picking up an item at a store or perform another task. In another example, user device 120 may forward a request for service from a plumber or a request for a ride from a particular location.

Figure 6:
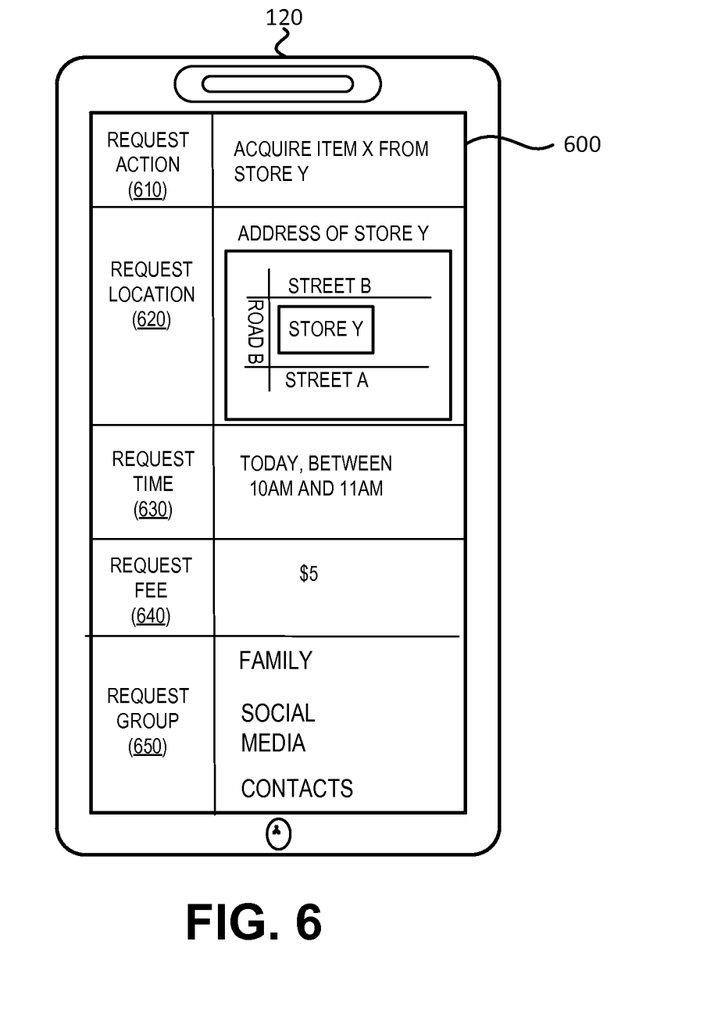

Referring to FIG. 6, an exemplary request interface 600 provided by user device 120 to submit the request in block 430 is shown. Registration interface 600 may include a request action area 610 identifying a good or service related to a request (shown in FIG. 6 as "ACQUIRE ITEM X FROM STORE Y"). In one implementation, request action area 610 may include multiple components of the requested action. In the illustrated action of "ACQUIRE ITEM X FROM STORE Y," request action area 610 may further include, for example, receiving a notification when a particular user device 120 is detected at store Y, and then forwarding a notification to the particular user device 120 to acquire item X.

Request interface 600 may also include a request location area 620 identifying one or more locations associated with the request (e.g., a city and state where a good is to be obtained or delivered). In FIG. 6, request location area 620 is shown to include the "ADDRESS OF STORE Y" and a visual representation (i.e., a graphical map) of the location. Request interface 600 may also include a request time area 630 identifying when (e.g., times and day) the request is to be carried out. In FIG. 6, request time area 630 is shown as "TODAY, BETWEEN 10 AM AND 11 AM."

Request interface 600 may also include a request fee area 640 identifying a fee (or other incentive) offered by a user device in connection with performing a request (shown in FIG. 6 as "$5"). It should be appreciated that non-monetary incentives may also be identified in request fee area 640, such as an offer by the requesting user to perform a future request.

In one implementation, request fee area 640 (or another portion of request interface 600) may include financial data associated with the requesting user. For example, the financial data may include a financial account identifier (e.g., a bank account routing number) that may be used by another user device 120 when performing the request (e.g., paying for an item to be acquired at a store) and/or to receive the request fee for performing the request. In one implementation, coordinator device 110 may use the financial data to verify that the requesting user device 120 has sufficient funds to pay the request fee, and coordinator device 110 may forward the request to other user devices 120 after verification of the request fee.

Request fee area 640 may also include data (e.g., a token a password) that the other user device 240 may forward to a financial institution or other party to verify that an identified financial account includes sufficient funds to pay the request fee identified in request fee area 640. Subsequently, upon completion of the request, the other user device 240 may use the data to obtain the requested fee. Alternatively, request fee area 640 may include a first token and a second token. Coordinator device 110 may provide the first token to the other user device 240, and the other user device 240 may use the first token to verify that the identified account has sufficient funds for the identified request fee. Coordinator device 110 may provide the second, different token to the other user device 240 upon completion of the request to enable the other user device 240 to receive the request fee.

In another example, the request fee area 640 may include account information identifying an existing relationship between the requesting user device 120 and another user device 120 that may perform the request. For example, if the requesting user device 120 is requesting automobile service that are covered by a service agreement (such as a warranty), request fee area 640 may include information identifying the service agreement. Similarly, if the requesting user device 240 is submitting a request associated with receiving a good/service at no or reduced cost from a charity, request fee area 640 may include information (e.g., a password received from the charity) verifying to another user device 240 that the user device 240 is eligible to receive the requested good/service for no or reduced cost. Coordinator device 110 may use the account information to verify that the requesting user device 120 is eligible to receive the requested good/service at the requested fee, and coordinator device 110 may forward the request to other user devices 120 after verification of the eligibility.

In another implementation, request fee area 640 may include data identifying a trusted third party that certifies that the requesting user has sufficient funds to pay for the request fee identified in request fee area 640. In addition or alternatively, request fee area 640 may include certification data indicating that the trusted third party has certified that the requesting user device 240 has sufficient funds to pay the request fee identified in request fee area 640, and coordinator device 110 may provide this certification data to another user device 240 and/or may forward a request to other user devices 120 based on receiving the certification data.

Request interface 600 may further include a request group area 650 identifying groups of user devices 120, selected to receive the request. For example, request group area 650 may identify other user devices 120 that the particular user device 120 has identified to provide a service. For example, request group area 650 may identify other user devices 120 that are in contractual relationship to service requests from the particular user device 120.

In FIG. 6, request group area 650 is shown to include a "FAMILY" group (e.g., user devices 120 associated with family members), a "SOCIAL MEDIA" group (e.g., user devices 120 associated with Facebook®, Google+®, and/or other social media connections), and a "CONTACTS" group (e.g., other user devices 120 identified in a "Contacts" records of the requesting user device 120). Although not shown in FIG. 6, request group area 650 may indicate that the request should be forwarded to a particular user device 120 (e.g., a user device 120 associated with a friend) or that the request be generally sent to multiple user devices 120 (e.g., user devices 120 located within a threshold distance).

In another implementation, instead of identifying one or more particular groups, request group area 650 may identify conditions for identifying user devices to receive the request. For example, request group area 650 may include information identify desired skills, credentials, or certifications. In another example, request group area 650 may include information identify a minimum desired rating (e.g., a rating received by a user device 120 in connection with responding to one or more other prior requests). Request group area 650 may include information identify a particular location (such that the request is forwarded to user devices 120 within a threshold distance of the particular location) and/or a particular fee (such that the request is forwarded to user devices 120 offering to perform a request at the particular fee).

Although FIG. 6 shows an exemplary request interface 600, in other implementations, request interface 600 may include fewer areas, different areas, differently arranged areas, or additional areas than depicted in FIG. 6. For example, request interface 600 may include payment information that may be used by a user device 120 in connection with performing the request (e.g., insurance coverage information to be used to purchase medication or other medical good). Request interface 600 may also include authentication information, from the original user device 120, that may be used by a user device 120 to verify, for example, the insurance coverage information to a vendor.

Returning to process 400 in FIG. 4, coordinator device 110 may further determine the status of user devices 120 in group identified to receive a request (block 440). For example, coordinator device 110 may determine locations of user devices 120, movements of user devices 120, activities being performed via user devices 120, messages sent via user devices 120, data being exchanged with user devices 120, applications being executed by user devices 120, etc. Coordinator device 110 may receive the status information from user device 120. In addition or alternatively, coordinator device 110 may receive the status information from another device (e.g., another device included in SPN 105) or may dynamically determine the status information 103 (e.g., based on messages exchanged with user device 120).

Coordinator device 110 may select a user device 120 based on the status data (block 450). For example, coordinator device 110 may select a particular user device 120 that is active (e.g., turned on) and/or available (e.g., within communications range of SPN 105). In the above example in which the request relates to acquiring an item from a store, coordinator device 110 may select user device 120 that is located geographically closest to the store. In another example, multiple user devices 120 may be selected to receive a request (e.g., user device 120 located within a threshold distance of the store).

Figure 7:
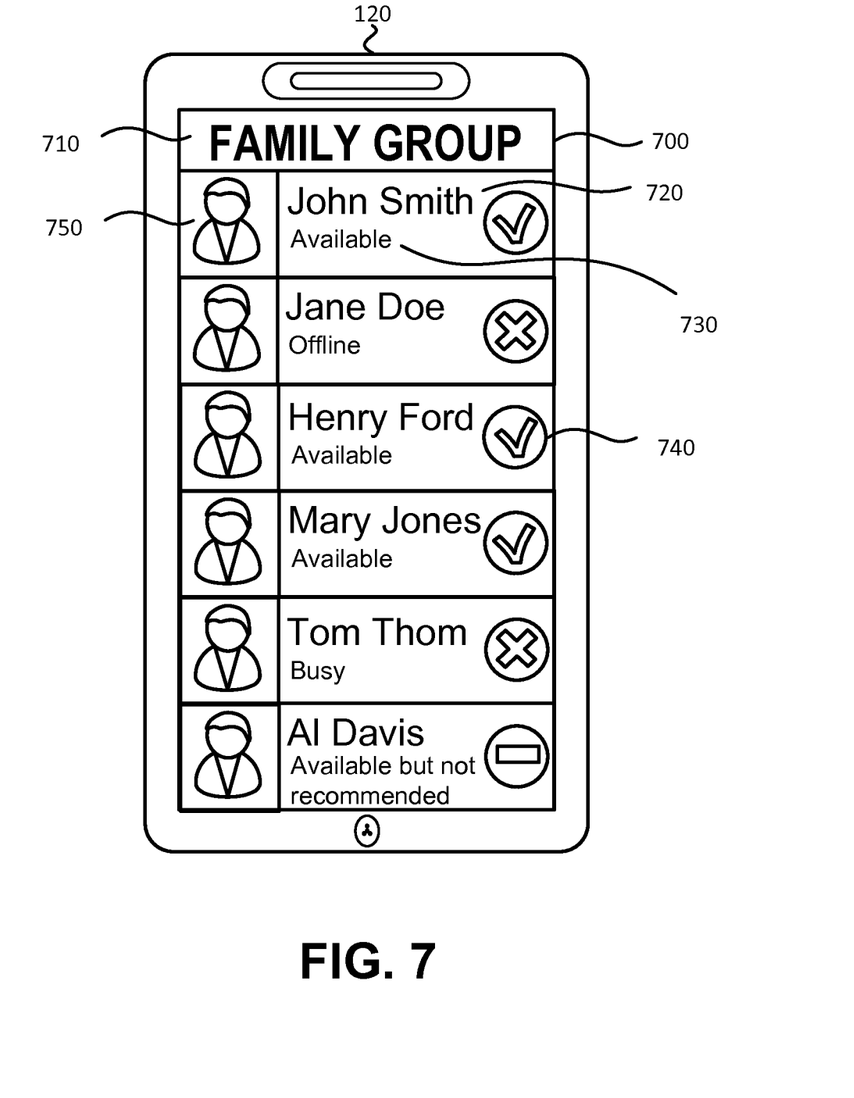

In one implementation, information identifying multiple user devices 120 may be forwarded to the requesting user device 120, and the user device 120 may then select one or more of the user devices 120 to receive the request. For example, as shown in FIG. 7, an exemplary selection interface 700 may be provided by user device 120 to receive a user selection from among multiple possible user devices 120. Selection interface 700 may include, for example, a group identifier 710 identifying a group for servicing a request (shown in FIG. 7 as "FAMILY GROUP"). The group represented by group identifier may be selected based on the request. For example, the request (e.g., request group area 650) may include information identifying a group and/or information identifying criteria (e.g., a desired location) for selecting user devices 120 to include in the group.

Selection interface 700 may also include identifying information 720 that identifies user devices 120 in the group designated by group identifier 710 (e.g., telephone number associated with the user devices 120) or associated users (e.g., shown in FIG. 7 as "John Smith," "Jane Doe," "Henry Ford," "Mary Jones," "Tom Thom," and "Al Davis"). User device 120 may receive an input (e.g., detect an input associated with region of selection interface 700) and identify one or more of user device 120 to receive a request based on the input.

In one implementation, the identifying information 720 may be sorted, or ranked, based on various criteria. For example, the identifying information 720 may be ranked based on prior ratings received by user devices 120 in connection with servicing other requests. Coordinator device 110 may also rank the identifying information 720 based on other factors, such as level of expertise relevant to the request, proximity of the user devices 120 to a relevant geographic location, and/or requested fees for servicing the request.

Selection interface 700 may also include, for example, status information 730 identifying the status of the identified user devices 120 (e.g., shown in FIG. 7 as indicating whether the user device 120 is "AVAILABLE," "OFFLINE," or "BUSY"). Selection interface 700 may also include, for example, a graphical indication 740 of the status of the identified user devices 120, and a graphical representation 750 of the identified user devices 120 (e.g., an image of the associated user). In the example shown in FIG. 7, graphical indication 740 may represent a recommendation regarding the identified user devices 120. Specifically, graphical representations 750 shown in FIG. 7 may include a check to identify available user devices 120, an "X" to identify unavailable (e.g., inactive or business user devices), and a dash (-) to identify available members of group that are not recommended for selection (e.g., located more than a threshold distance from a geographic location associated with a request).

Although FIG. 7 shows an exemplary selection interface 700, in other implementations, selection interface 700 may include fewer data, different data, differently arranged data, or additional data than depicted in FIG. 7. For example, selection interface 700 may include information identifying other request being performed by the identified user devices 120.

Returning to process 400 in FIG. 4, coordinator device 110 may forward data regarding a request to the selected user device 120 (block 460). The request data may include information to enable the receiving user device 120 to perform the request. For example, the request data may identify a good or service to be provided, a task to be performed, a location and time to perform the task, a user device 120 associated with the request, and a fee (or other incentive) offered to the recipient user device 120 for performing the task.

In one implementation, coordinator device 110 may update request storage 130 to classify the request as being assigned and, therefore, no longer subject to assignment. Coordinator device 110 may also update device profile storage 140 to classify the selected user device 120 as busy and, therefore, subject to monitoring with respect to the request and/or no longer available to accept another request.

Figure 8:
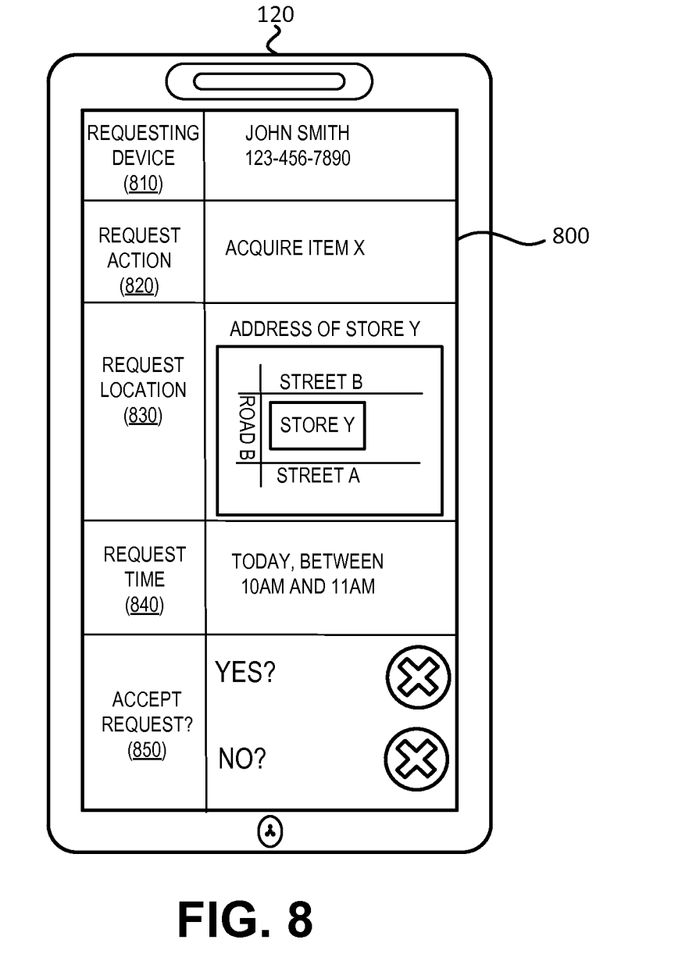

Referring to FIG. 8, an exemplary confirmation interface 800 provided by a selected user device 120 (e.g., a user device 120 selected in process block 450 to fulfill a request) is shown. Confirmation interface 800 may include a request area 810 identifying a user device/and or a user associated with the request (shown in FIG. 8 as "JOHN SMITH, 123-456-7890"). Confirmation interface 800 may include a request action area 820 identifying a good or service related to a request (shown in FIG. 8 as "ACQUIRE ITEM X"). Request interface 800 may also include a request location area 830 identifying one or more locations associated with the request (e.g., a city and state where a good is to be obtained or delivered). In FIG. 8, request location area 830 is shown to include the "ADDRESS OF STORE Y," and further includes a visual representation (i.e., map) of the location. Request interface 800 may also include a request times area 840 associated with data identifying when (e.g., times and day) the request is to be carried out. In FIG. 8, request time area 840 is shown as "TODAY, BETWEEN 10 AM AND 11 AM."

Request interface 800 may further include a request acceptance area 850 prompting a user to submit an input indicating whether user device 120 accepts the request. As shown in FIG. 8, request acceptance area 850 may include "YES" and "NO" and graphical elements that may be selected by the user to indicate whether to accept the request. If the request is accepted (e.g., an input selecting the "YES" graphical element is receive), a notification may be forwarded to requesting user device 120 identifying the other user device 120 tasked to fulfill the request. A notification may also be forwarded to other user devices 120 indicating that the request is no longer available for acceptance.

In one implementation, if request is associated with several services or goods, the request may be divided between two or more user devices 120. In the prior-described example of request related to acquiring an item at a store, a first user device 120 may commit to acquire the item and a second, different user device 120 may commit to obtaining the item from the first user device 120 and delivering the item to a location of the original requestor. In this implementation, a notification may also be forwarded to the requesting user device 120 identifying various user devices 120 committed to performing different aspects of the request.

If a request is not accepted after a particular amount of time, requesting user device 120 may be prompted to change the request, such as to increase an incentive for accepting a request and/or to modify the request.

Although FIG. 8 shows an exemplary request interface 800, in other implementations, request interface 800 may include fewer areas, different areas, differently arranged areas, or additional areas than depicted in FIG. 8. For example, request interface 800 may include a section that allows a user to submit a conditional acceptance of the request, such as to indicate that user device 120 could perform the requested action but at a different time and/or for a different reward.

Returning to process 400 in FIG. 4, coordinator device 110 may determine updated status information about the selected user device (block 470), and determine whether the request is completed by the user device based on the updated status information (block 475). For example, if a task relates to servicing a vehicle, coordinator device 110 may infer that the request is completed when a relevant user device is detected near the vehicle for a threshold amount of time. In block 470, the update status may also be determined based on information received from one or more of a requesting user device 120 or another user device 120 who promised to service the request. For example, coordinator device 110 may receive a message or other indication from user device 120 when the request is completed. For example, coordinator device 110 may receive a rating or other feedback regarding the servicing of the request. In one implementation, coordinator device 110 may update device profile storage 140 reflect the updated status data.

When coordinator device 110 determines that the request is completed (block 475—"YES"), coordinator device 110 may credit the selected user device 120 for completing the request (block 480). For example, coordinator device 110 may authorize allocation of a payment from a financial account associated with the requesting user device 120 to a financial account associated with the servicing user device 120. Coordinator device 110 may update request storage 130 to classify the request as being complete and, therefore, no longer subject to assignment and/or monitoring. Coordinator device 110 may also update requests device profile storage 140 to classify the servicing user device 120 as reliable and available to receive another request. In one example, coordinator device 110 may forward a notification to the requesting user device 120 that the request is completed. Coordinator device 110 may also prompt the servicing user device 120 forward a message to the requesting user device 120 and/or to provide evidence that the request is completed, such as prompting the servicing user device 120 to forward an image of an acquired item or proof of purchase (e.g., an image of a purchase receipt).

When coordinator device 110 determines that the request is not completed (block 475—"NO"), coordinator device 110 may determine whether a threshold amount of time has elapsed since the request was assigned to a user device 120 for completion (block 485). If the threshold amount of time has not elapsed since request was assigned to the user device 120 for completion (block 485—"NO"), coordinator device 110 may continue to determine updated status information in block 470.

Conversely, if the threshold amount of time has elapsed since request was assigned to the user device 120 for completion (block 485—"YES"), coordinator device 110 may reassign the request to another user device 120 (block 490). In this situation, coordinator device 110 may forward request data to newly selected user device in process block 460. Coordinator device may also update request storage 130 to reflect reassignment of the request.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Also, while a series of blocks have been described with respect to FIG. 4, the order of the blocks may be modified in other implementations. Further, non-dependent blocks may be performed in parallel. In one implementation, process 400 may further include forwarding data related to the request to one or more applications executed by user device 120 in connection with carrying out the request. For example, a location associated with a request may be automatically provided to a mapping application that directs the user device 120 to the location. In addition or alternatively, information identifying timing associated with a request may be automatically provided to a scheduling application that provides reminders regarding deadlines for completing the request. In another implementation, payment information associated with a request may be automatically provided to a financial application that may be used in connection with the fulfilling request (e.g., to pay for an item to be acquired at a store) and/or to receive a financial reward for performing the request.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a computer device, registration data regarding user devices;
   determining, by the computer device, a group that includes two or more of the user devices based on registration data;
   receiving, by the computer device, a request from a first user device included in the group, wherein the request relates to receiving a good or service;
   determining, by the computer device, status data for the two or more user devices included in the group;
   selecting, by the computer device, a second user device from the group based on the status data;
   causing, by the computer device, data associated with the request to be forwarded to the second user device;
   determining, by the computer device, whether the second user device completed the request during a particular time period, wherein determining whether the second user device completed the request during the particular time period includes:

identifying a first geographic location associated with the request,
identifying a second geographic location, associated with the second user device during the particular time period, and
determining that the second user device completed the request when the second geographic location corresponds to the first geographic location;
assigning, by the computer device, credit to the second user device based on determining that the second user device completed the request during the particular time period;
reallocating, by the computer device, the request to a third user device included in the group based on determining that the second user device did not complete the request during the particular time period; and
assigning, by the computer device, credit to the third user device based on the third user device completing the request during the particular time period.

2. The method of claim 1, wherein:
the status information identifies respective second geographic locations associated with the two or more user devices, and
selecting the second user device is based on comparing the first geographic location to the respective second geographic locations.

3. The method of claim 1, wherein selecting the second user device from the group includes:
identifying at least two user devices from the group based on the status data;
providing, to the first user device, information identifying the at least two user devices; and
receiving, from the first user device, a selection of the second user device from the at least two user devices.

4. The method of claim 1, wherein determining the group includes:
identifying as the two or more of the user devices included in the group, a plurality of the user devices that have entered a commercial relationship to perform certain services or provide certain goods.

5. The method of claim 1, wherein the registration data identifies respective fields of expertise associated with the two or more user devices included in the group, and
wherein selecting the second user device from the group is further based on comparing the request to the respective fields of expertise associated with the two or more user devices included in the group.

6. The method of claim 1, wherein:
the registration data identifies respective ratings associated with the two or more user devices included in the group,
the respective ratings relate to performance of other requests by the two or more user devices, and
selecting the second user device from the group is further based on the respective ratings.

7. A system comprising:
a memory configured to store profiles associated with user devices; and
a processor configured to:
receive data regarding the user devices,
update the profiles based on data regarding the user devices,
determine a group that includes two or more of the user devices based on the updated profiles,
receive a request from a first user device included in the group, wherein the request relates to receiving a good or service,
select a second user device from the group based on the updated profiles and the request,
cause data associated with the request to be forwarded to the second user device,
determine whether the second user device completed the request during a particular time period, wherein the processor, when determining whether the second user device completed the request during the particular time period, is further configured to:
identify a first geographic location associated with the request,
identify a second geographic location, associated with the second user device during the particular time period, and
determine that the second user device completed the request when the second geographic location corresponds to the first geographic location,
assign credit to the second user device when the second user device completes the request during the particular time period,
reallocate the request to a third user device included in the group when the second user device does not complete the request during the particular time period, and
assign credit to the third user device based on the third user device completing the request during the particular time period.

8. The system of claim 7, wherein:
the profiles identify respective second geographic locations associated with the two or more user devices, and
the processor is further configured to select the second user device based on comparing the first geographic location to the respective second geographic locations.

9. The system of claim 7, wherein, the processor, when selecting the second user device from the group, is further configured to:
identify at least two user devices from the group based on the status data,
provide, to the first user device, information identifying the at least two user devices, and
receive, from the first user device, a selection of the second user device from the at least two user devices.

10. The system of claim 7, wherein the processor is further configured to:
provide a first interface to receive data regarding the user devices from one or more of the user devices, and
provide a second interface to receive the request from the first user device.

11. The system of claim 10, wherein the processor is further configured to:
provide a third interface to receive a confirmation from the second user device confirming acceptance of the request.

12. The system of claim 7, wherein the processor, when determining the group, is further configured to:
identify, as the two or more of the user devices included in the group, a plurality of the user devices that have entered a commercial relationship to perform certain services or provide certain goods.

13. The system of claim 7, wherein the registration data identifies respective fields of expertise associated with the two or more user devices included in the group, and
wherein the processor is configured to select the second user device from the group further based on comparing the request to the respective fields of expertise.

14. The system of claim 7, wherein:
the registration data identifies respective ratings associated with the two or more user devices included in the group,
the respective ratings relate to performance of other requests by the two or more user devices, and the processor is configured to select the second user device from the group further based on the respective ratings.

15. A non-transitory computer-readable medium storing instructions, the instructions comprising:
one or more instructions that, when executed by a processor, cause the processor to:
receive data regarding the user devices, wherein the data regarding the user devices includes information identifying relationships between the users associated with the user devices,
select, based on relationships between the users associated with the user devices, a group that includes two or more of the user devices,
receive a request from a first user device included in the group, wherein the request relates to receiving a good or service,
select a second user device from the group based on the request,
cause data associated with the request to be forwarded to the second user device,
determine whether the second user device completed the request during a particular time period, wherein the one or more instructions when causing the processor to determine whether the second user device completed the request during the particular time period, further cause the processor to:
identify a first geographic location associated with the request,
identify a second geographic location, associated with the second user device during the particular time period, and
determine that the second user device completed the request when the second geographic location corresponds to the first geographic location,
assign credit to the second user device when the second user device completes the request during the particular time period,
reallocate the request to a third user device included in the group when the second user device does not complete the request during the particular time period, and
assign credit to the third user device based on the third user device completing the request during the particular time period.

16. The non-transitory computer-readable medium of claim 15, wherein:
the profiles identify respective second geographic locations associated with the two or more user devices, and
the one or more instructions, when causing the processor to select the second user device, further cause the processor to:
select the second user device based on comparing the first geographic location to the respective second geographic locations.

17. The non-transitory computer-readable medium of claim 15, wherein the one or more instructions, when causing the processor to select the second user device from the group, further cause the processor to:
identify at least two user devices from the group based on the status data,
provide, to the first user device, information identifying the at least two user devices, and
receive, from the first user device, a selection of the second user device from the at least two user devices.

18. The non-transitory computer-readable medium of claim 15, wherein the one or more instructions further cause the processor, when determining the group, to be further configured to:
identify, as the two or more of the user devices included in the group, a plurality of the user devices that have entered a commercial relationship to perform certain services or provide certain goods.

19. The non-transitory computer-readable medium of claim 15, wherein the registration data identifies respective fields of expertise associated with the two or more user devices included in the group, and
wherein the one or more instructions further cause the processor, when selecting the second user device from the group, to be further configured to select the second user device from the group further based on comparing the request to the respective fields of expertise.

20. The non-transitory computer-readable medium of claim 15, wherein:
the registration data identifies respective ratings associated with the two or more user devices included in the group,
the respective ratings relate to performance of other requests by the two or more user devices, and
the one or more instructions cause the processor, when selecting the second user device from the group, to be configured to select the second user device from the group further based on the respective ratings.

* * * * *